(12) United States Patent
Inoue et al.

(10) Patent No.: US 10,153,110 B2
(45) Date of Patent: Dec. 11, 2018

(54) VACUUM CIRCUIT BREAKER

(71) Applicant: Mitsubishi Electric Corporation, Chiyoda-ku, Tokyo (JP)

(72) Inventors: Naoaki Inoue, Tokyo (JP); Taichi Maeda, Tokyo (JP); Katsunori Kawanishi, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 0 days.

(21) Appl. No.: 15/556,394

(22) PCT Filed: Apr. 4, 2016

(86) PCT No.: PCT/JP2016/060998
§ 371 (c)(1),
(2) Date: Sep. 7, 2017

(87) PCT Pub. No.: WO2016/194464
PCT Pub. Date: Dec. 8, 2016

(65) Prior Publication Data
US 2018/0047532 A1  Feb. 15, 2018

(30) Foreign Application Priority Data

Jun. 5, 2015 (JP) .................................. 2015-114378

(51) Int. Cl.
*H01H 33/666* (2006.01)
*H01H 33/66* (2006.01)
(Continued)

(52) U.S. Cl.
CPC .......... *H01H 33/666* (2013.01); *H01H 33/66* (2013.01); *H01H 33/662* (2013.01); *H02B 13/0352* (2013.01); *H02B 13/0354* (2013.01)

(58) Field of Classification Search
CPC ............... H01H 33/666; H01H 33/662; H01H 2033/6623; H01H 33/66; H02B 13/02; H02B 13/035
(Continued)

(56) References Cited

U.S. PATENT DOCUMENTS 4,434,331 A    2/1984  Sakuma et al.
5,864,108 A *  1/1999  Rohling ............... H01H 33/666
                                                    218/134
(Continued)

FOREIGN PATENT DOCUMENTS

JP    48-9967        2/1973
JP    56-109416 A    8/1981
(Continued)

OTHER PUBLICATIONS

International Search Report (PCT/ISA/210) dated Jun. 28, 2016, by the Japanese Patent Office as the International Searching Authority for International Application No. PCT/JP2016/060998.

*Primary Examiner* — Edwin A. Leon
*Assistant Examiner* — William Bolton
(74) *Attorney, Agent, or Firm* — Buchanan Ingersoll & Rooney PC

(57) ABSTRACT

An object is to eliminate, through an inexpensive structure, degradation in withstand voltage performance and degradation in energization performance caused by heating in a vacuum circuit breaker. The vacuum circuit breaker includes a main circuit structure body having an insulation rod, a vacuum valve, a movable side terminal, and the like and an insulating holder for supporting the main circuit structure body. The insulating holder is a frame structure body having opening portions in the top and bottom surfaces and both side surfaces of the section in which the vacuum valve is disposed and the section in which the insulation rod is disposed.

12 Claims, 5 Drawing Sheets

(51) Int. Cl.
*H01H 33/662* (2006.01)
*H02B 13/035* (2006.01)
(58) Field of Classification Search
USPC ....... 218/140, 118, 120, 134, 137, 139, 146, 218/155
See application file for complete search history.

(56) References Cited

U.S. PATENT DOCUMENTS

| | | | |
|---|---|---|---|
| 8,237,075 B2* | 8/2012 | Isoya | H01H 33/6661 218/134 |
| 2005/0029001 A1* | 2/2005 | Sato | H01B 3/02 174/50 |
| 2008/0047819 A1* | 2/2008 | Takahara | H01H 3/60 200/540 |
| 2015/0221457 A1* | 8/2015 | Hyrenbach | H01H 9/0207 200/293 |

FOREIGN PATENT DOCUMENTS

| | | |
|---|---|---|
| JP | 56-128528 A | 10/1981 |
| JP | 58-148842 U | 10/1983 |
| JP | 2002-231112 A | 8/2002 |
| JP | 2013-131440 A | 7/2013 |
| JP | 2013-149579 A | 8/2013 |

\* cited by examiner

VACUUM CIRCUIT BREAKER

TECHNICAL FIELD

The present invention relates to a vacuum circuit breaker installed in a gas insulating switch gear or the like and, more particularly, to the main circuit structure of a vacuum circuit breaker.

BACKGROUND ART

The good insulation performance of sulfur hexafluoride (SF6) gas makes a gas insulating switch gear compact and contributes to reduction in the space of an electric chamber. In a vacuum circuit breaker installed in this gas insulating switch gear, the operation mechanism of the vacuum circuit breaker is generally disposed outside the gas container, the main circuit portion of the vacuum circuit breaker is disposed inside the gas container, and the operation mechanism is coupled to the main circuit portion via a drivable shaft while the airtightness between the inside and the outside of the gas container is maintained.

Although the main circuit portion of the vacuum circuit breaker includes an insulation operation rod, a movable side terminal, a vacuum valve, and a fixed side terminal, these structural members of the main circuit portion need to be supported in the gas container while being insulated from the gas container that is kept at the ground potential. Therefore, the main circuit portion of the vacuum circuit breaker is generally supported by an insulator or an insulating holder in the gas container.

When the main circuit portion of the vacuum circuit breaker is supported by the insulating holder as described above, if the insulating holder is formed in, for example, a cylinder to surround the vacuum valve, the electric field outside the vacuum valve becomes high and the withstand voltage performance degrades. In addition, since the vacuum valve is heated during energization, if the vacuum valve is surrounded, the temperature around the vacuum valve rises because the convection of air is suppressed and the energization performance degrades.

A vacuum circuit breaker as indicated in, for example, PTL 1 or PTL 2 has been proposed to solve such problems.

That is, in the vacuum circuit breaker indicated in PTL 1, as illustrated in particularly in FIG. 3, the first insulating frame and the second insulating frame each having a U-shaped cross section are disposed so as to cover the vacuum valve from the left and right sides of the vacuum valve with a clearance left therebetween and the first insulating frame and the second insulating frame are tightened by the fixed side conductor of the vacuum valve.

In addition, as illustrated in FIGS. 1 and 4, the vacuum circuit breaker indicated in PTL 2 includes a pair of insulation support plates disposed so as to sandwich the vacuum valve from the up and down sides and an upper electrode, fixed to one end of the insulation support plate, to which the fixed side of the vacuum valve is fixed.

CITATION LIST

Patent Literature

PTL 1: JP-A-2013-131440 (see particularly FIG. 3)
PTL 2: JP-A-2013-149579 (see particularly FIGS. 1 and 4)

SUMMARY OF INVENTION

Technical Problem

Although the vacuum circuit breakers proposed in PTL 1 and PTL 2 are provided with opening portions in the insulating object around the vacuum valve to improve the convection of air in, since one vacuum valve is supported by two insulating frames, if the lengths of the two insulating frames slightly differ, one of the insulating frames receives an impact load caused in the vacuum valve when the breaker is turned on. Accordingly, the strength as an insulating frame becomes unstable and the reliability of withstand voltage performance and energization performance as the vacuum valve is lost.

In addition, when one vacuum valve is supported by two insulating frames as in the vacuum circuit breaker proposed in PTL 1, six insulating frames are necessary in the case of a three-phase breaker, thereby increasing the cost.

In addition, when the three-phase integration structure is adopted in the insulating frame as in the vacuum circuit breaker proposed in PTL 2, if vacuum valves for three phases are arranged, the assembly performance of the middle phase is reduced.

In addition, since the fixation plate for fixing the fixed side of the vacuum valve is requested to have the strength that can endure an impact load caused in the main circuit when the vacuum circuit breaker is turned on or off and the function of energizing the vacuum circuit breaker main circuit, the fixation plate needs to be made of a material having high energization performance, such as copper or aluminum, and have a thickness enduring the impact load. Accordingly, the fixation plate becomes large and expensive.

The invention addresses the above problems with an object of obtaining the main circuit structure of a vacuum circuit breaker that has high stability and can suppress the cost without reducing the withstand voltage performance and the energization performance.

Solution to Problem

A vacuum circuit breaker according to the invention includes a main circuit structure body including a vacuum valve having a fixed contact and a movable contact, a fixed side terminal connected to the fixed contact of the vacuum valve, a movable side terminal connected to the movable contact of the vacuum valve, and an insulation rod coupled to the movable contact of the vacuum valve, the insulation rod opening and closing the fixed contact and the movable contact and an insulating holder for supporting the main circuit structure body, in which the insulating holder is a frame structure body having opening portions in top and bottom surfaces and both side surfaces of a section in which the vacuum valve is disposed and a section in which the insulation rod is disposed.

Advantageous Effects of Invention

According to the invention, it is possible to provide, at low cost, a vacuum circuit breaker capable of improving the convection of air without increasing the electric field outside the vacuum valve and improving the reliability of withstand voltage performance and energization performance around the vacuum valve of the vacuum circuit breaker by adopting a frame structure body as the insulating holder supporting the main circuit structure body including a vacuum valve.

DESCRIPTION OF EMBODIMENTS

Embodiment 1

The switch gear according to embodiment 1 of the invention will be described with reference to FIGS. 1 to 9.

Figure 1:
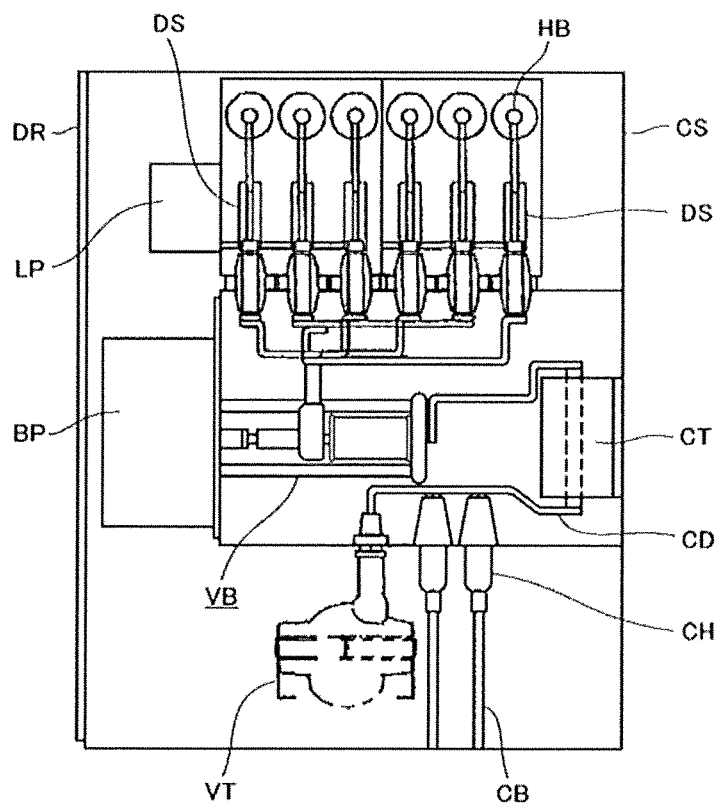
FIG. 1 is a side cross sectional view illustrating a switch gear in which a vacuum circuit breaker according to embodiment 1 of the invention is provided.
Figure 2:
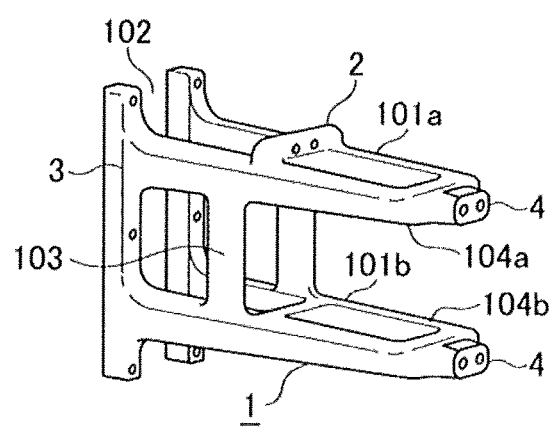
FIG. 2 is a perspective view illustrating an insulating holder according to embodiment 1 of the invention.
Figure 3:
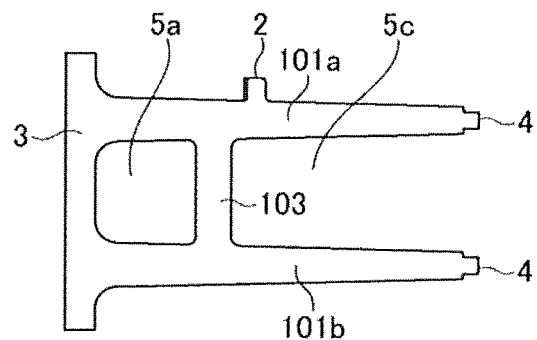
FIG. 3 illustrates a side surface of the insulating holder in FIG. 2.
Figure 4:
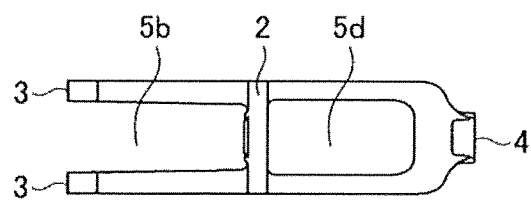
FIG. 4 illustrates the top surface of the insulating holder in FIG. 2.
Figure 5:
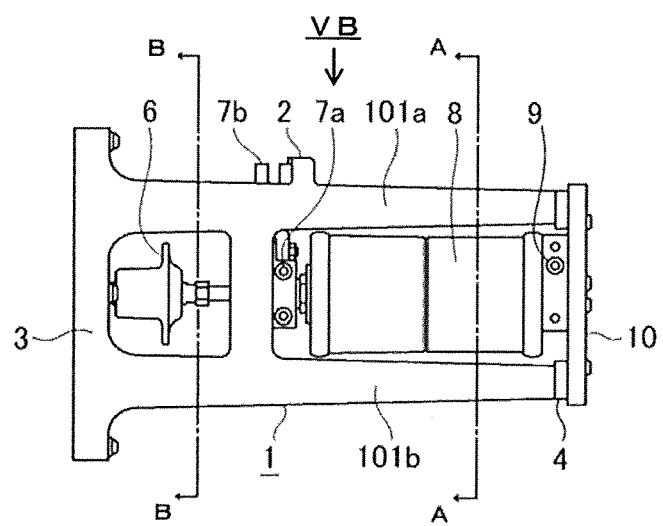
FIG. 5 is a side view illustrating a vacuum circuit breaker single pole portion according to embodiment 1 of the invention.
Figure 6:
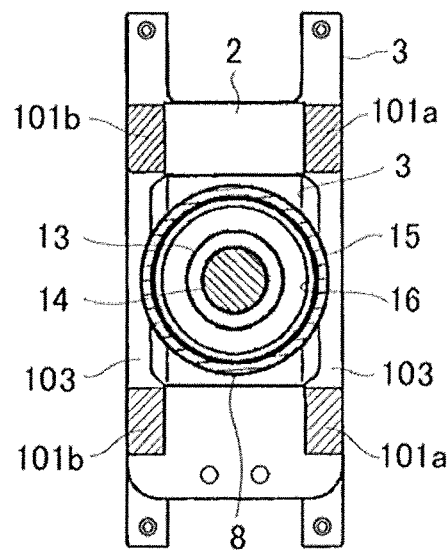
FIG. 6 illustrates a cross section taken along line A-A in FIG. 5.
Figure 7:
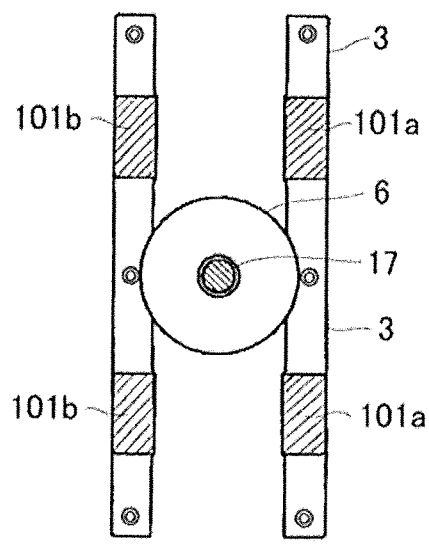
FIG. 7 illustrates a cross section taken along line B-B in FIG. 5.
Figure 8:
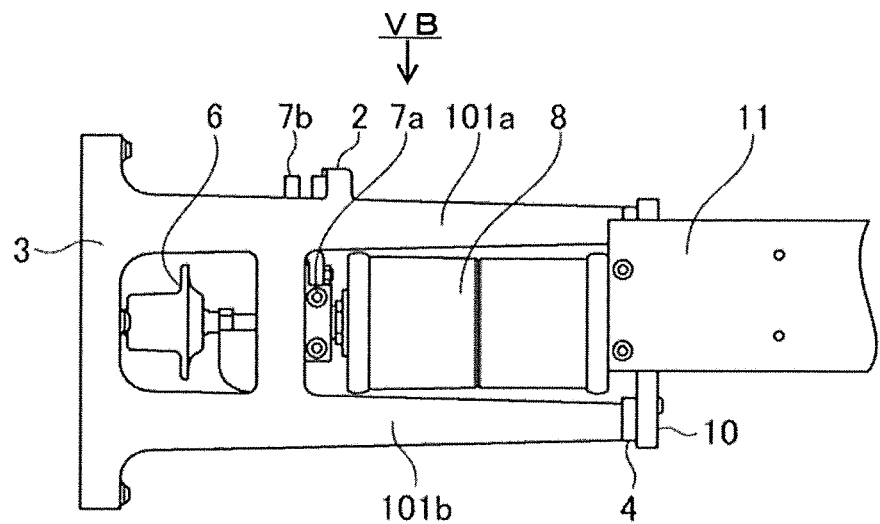
FIG. 8 is a side view illustrating the structure of the main part of the vacuum circuit breaker according to embodiment 1 of the invention.
Figure 9:
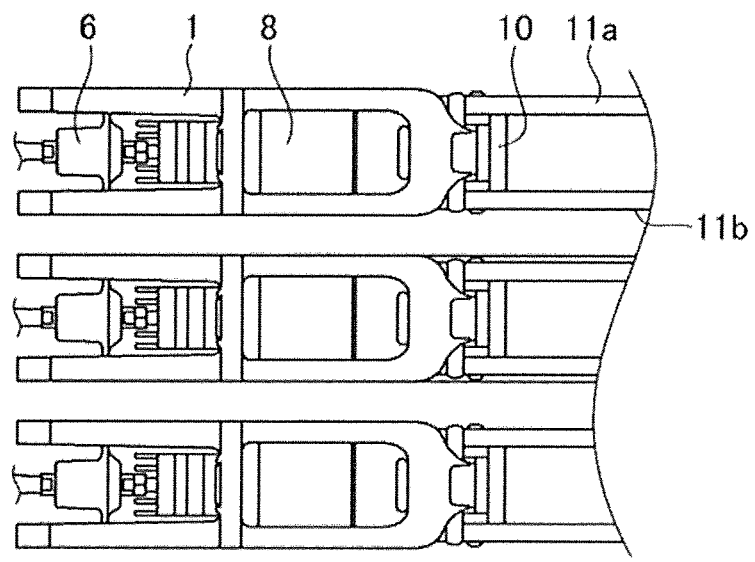
FIG. 9 is a plan view illustrating the top surface of the vacuum circuit breaker in FIG. 8.

FIG. 1 is the side cross sectional view illustrating the switch gear in which the vacuum circuit breaker according to embodiment 1 of the invention is provided, FIG. 2 is the perspective view illustrating the insulating holder according to embodiment 1 of the invention, FIG. 3 illustrates the side surface of the insulating holder in FIG. 2, and FIG. 4 illustrates the top surface of the insulating holder in FIG. 2. In addition, FIG. 5 is the side view illustrating the vacuum circuit breaker single pole portion according to embodiment 1 of the invention, FIG. 6 illustrates the cross section taken along line A-A in FIG. 5, and FIG. 7 illustrates the cross section taken along line B-B in FIG. 5. FIG. 8 is the side view illustrating the structure of the main part of the vacuum circuit breaker according to embodiment 1 of the invention and FIG. 9 is the plan view illustrating the top surface of the vacuum circuit breaker in FIG. 8.

In FIG. 1, the switch gear includes a door DR, a cabinet CS in which individual components are accommodated, a vacuum circuit breaker VB, an instrument current transformer CT, an instrument voltage transformer VT, and a disconnecting switch DS that are provided in the cabinet CS.

Here, in the vacuum circuit breaker VB, one terminal is connected to a cable CB via a connection conductor CD and a cable head CH and the other terminal is connected to a horizontal bus HB. In addition, in the vacuum circuit breaker VB, the instrument current transformer CT and the instrument voltage transformer VT are connected to the path connected to the cable CB and the disconnecting switch DS is connected to the path connected to the horizontal bus HB. In addition, the switch gear includes a disconnecting switch operation mechanism portion LP in which a disconnecting switch operation mechanism for operating the disconnecting switch DS is accommodated and a circuit breaker operation mechanism portion BP in which a circuit breaker operation mechanism for operating the vacuum circuit breaker VB is accommodated.

In addition, as illustrated in FIG. 5, the main circuit structure body forming the vacuum circuit breaker VB includes a vacuum valve 8 having a fixed contact and a movable contact, a fixed side terminal 9 connected to the fixed contact of the vacuum valve 8, a movable side terminal 7a connected to the movable contact of the vacuum valve 8, and an insulation rod 6, coupled to the movable contact of the vacuum valve 8, that opens and closes the movable contact, and the main circuit structure body is fixed to an insulating holder 1 via a fixation plate 10 and a fixation plate fixation portion 4.

The vacuum valve 8 has a vacuum container formed by an insulation cylinder, and a fixed contact and a movable contact disposed in the vacuum container. Here, the fixed contact of the vacuum valve 8 is fixed to the end of the fixed electrode rod and the fixed electrode rod is fixed to the fixed side end plate provided on one end surface of the insulation cylinder. In addition, the movable contact adheres to the end of the movable electrode rod driven by the insulation rod 6 and opens and closes the fixed contact according to the motion of the movable electrode rod. In addition, the movable electrode rod penetrates through the movable side end plate provided on the other end surface of the insulation cylinder and the penetration portion is sealed by a sealing member formed by a bellows. In addition, the fixed side terminal 9 connected to the fixed contact is fixed to the fixed side electrode rod and the movable side terminal 7a connected to the movable contact is fixed to the movable side electrode rod.

Next, the structure of the insulating holder 1, which is the main part of the invention, will be described in detail.

That is, as illustrated in FIG. 2, the insulating holder 1 includes a movable conductor fixation portion 2 for fixing the movable conductor of the vacuum circuit breaker VB, a fixation portion 3 for fixing the insulating holder 1, and the fixation plate fixation portion 4 for fixing the fixation plate 10 to which the main circuit structure body is attached.

More specifically, the insulating holder 1 is configured as a frame structure body in which, as illustrated in FIG. 4, two U-shaped frames 101 coupled in the innermost portion (right side in the drawing) are stacked vertically as illustrated in FIG. 3, one end of a upper frame 101a, which is the upper one of the frames 101, and one end of a lower frame 101b, which is the lower one of the frames 101, on the opening side 102, are integrally coupled by the insulating holder fixation portion 3 extending vertically, and the intermediate portions of the U-shaped upper frame 101a and lower frame 101b are coupled integrally by the intermediate frames 103 extending vertically. The insulating holder 1 as described above is manufactured by integrally molding an insulating resin material.

The insulation rod 6 is disposed in the space surrounded by the insulating holder fixation portions 3 of the insulating holder 1, the intermediate frames 103, and the parts of the U-shaped frames 101 close to the insulating holder fixation portions as described above and the vacuum valve 8 is disposed in the space surrounded by the corners 104a and 104b of the U-shaped frames 101a and 101b and the intermediate frames 103, and the vacuum circuit breaker VB as illustrated in FIG. 5 is thereby formed. It should be noted that the intermediate frames 103 may be omitted as long as the strength is sufficient.

When a vacuum circuit breaker single pole is disposed in the insulating holder 1 of the vacuum circuit breaker VB as illustrated in FIG. 5, an insulation rod side surface opening portion 5a (see FIG. 3) and an insulation rod top surface opening portion 5b (see FIG. 4) are provided in the position in which the insulation rod 6 is disposed and a vacuum valve side surface opening portion 5c (see FIG. 3) and a vacuum valve top surface opening portion 5d (see FIG. 4) are provided in the position in which the vacuum valve 8 is disposed.

As described above, when the vacuum circuit breaker single pole is disposed in the insulating holder 1, the movable side terminal 7a and a movable conductor 7b of the vacuum valve are attached on the movable side of the vacuum valve 8 and the movable conductor 7b is tightened to the movable conductor fixation portion 2. In addition, the fixed side terminal 9 is attached on the fixed side of the vacuum valve 8 and the fixed side terminal 9 is tightened to the frame 101 of the insulating holder 1 via the fixation plate 10 and the fixation plate fixation portion 4.

FIG. 6 illustrates a cross section taken along line A-A in FIG. 5 and indicates an electrode 13, an electrode rod 14, an insulation tube (insulation cylinder) 15, and an electrode shield 16 of the vacuum valve 8 disposed in the insulating holder 1. FIG. 7 illustrates a cross section taken along line B-B in FIG. 5 and indicates the insulation rod 6 and an operation rod 17 of the vacuum valve 8 disposed in the insulating holder 1.

FIGS. 8 and 9 illustrate an example of application to the three-phase vacuum circuit breaker VB, FIG. 8 illustrates the state in which a fixed side conductor 11 is attached to the vacuum valve fixed side terminal 9 of the vacuum circuit breaker single pole structure in FIG. 5, and FIG. 9 illustrates the structure in which a fixed side conductor 11a and a fixed side conductor 11b are tightened to both sides of one fixed side terminal 9 of the vacuum valve 8 so that the wide portion thereof is oriented vertically.

By directly attaching the fixed side conductors 11 (11a and 11b) to both side surfaces of the fixed side terminal 9 of the vacuum circuit breaker VB without intervening the fixation plate 10 for fixing the vacuum valve 8 and the insulating holder 1, it is possible to improve the energization performance because of increase in the cross sectional area of the conductor and improve the radiation performance of the conductive portion without interfering with the convection of air since the fixed side conductor 11a and the fixed side conductor 11b, which are flat conductors, are disposed vertically. Although the two conductors (11a and 11b) are used as the fixed side conductors 11 in this example, only one of these two conductors may be used when the flowing current is low.

Since the insulating holder 1 is formed by a frame structure body having opening portions in the top surface and side surfaces as described above, it is possible to form the main circuit structure body having high radiation performance without interfering with the convection of air around the vacuum valve 8. In addition, since the insulating holder 1 is provided with large opening portions, bolt tightening work during assembly can be facilitated. In addition, since the insulating holder 1 is constructed for each phase, it is possible to first attach and assemble only the middle phase among three phases of the vacuum circuit breakers VB disposed side by side, and then attach the phases on both sides, thereby improving the workability of assembly.

In addition, since the vacuum circuit breaker VB is a device that operates the movable electrode of the vacuum valve 8 to turn on or off current, the insulating holder 1 supporting the vacuum valve 8 needs to have a strength enduring an impact load caused when the vacuum circuit breaker is closed or opened and the fixation plate 10 fixing the insulating holder 1 and the vacuum valve 8 also needs to have a strength enduring an impact load similarly. Therefore, in embodiment 1, as illustrated in FIGS. 5 and 8, the fixation plate 10 has the function of supporting the vacuum valve 8 by enduring an impact of the vacuum circuit breaker and the fixed side terminal 9 has the function of connecting to and energizing vacuum circuit breaker main circuit. That is, the fixed side terminal 9 has the energization function and the fixation plate 10 has the reinforcement function. Accordingly, the fixation plate 10 does not need to be made of an expensive metal such as aluminum or copper that has good energization performance and may be made of an inexpensive metal such as iron.

In addition, the fixation plate 10 has a size larger than the diameter of the vacuum valve 8 since the fixation plate 10 is disposed across the ends of the U-shaped frames 101 as illustrated in FIG. 5 and the fixation plate 10 needs to have a thickness large enough to obtain a sufficient strength for supporting the vacuum valve 8. As described above, the fixation plate 10 has a large size and the material cost becomes high, but increase in cost can be suppressed by using an inexpensive material such as, for example, iron. In addition, although the fixed side terminal 9 needs an expensive material having high energization performance, such as copper or aluminum, the size substantially identical to the diameter of the vacuum valve 8 is sufficient and the material cost is not so high.

Embodiment 2

Next, the vacuum circuit breaker, which is the main part of the switch gear according to embodiment 2 of the invention, will be described with reference to FIG. 10.

Figure 10:
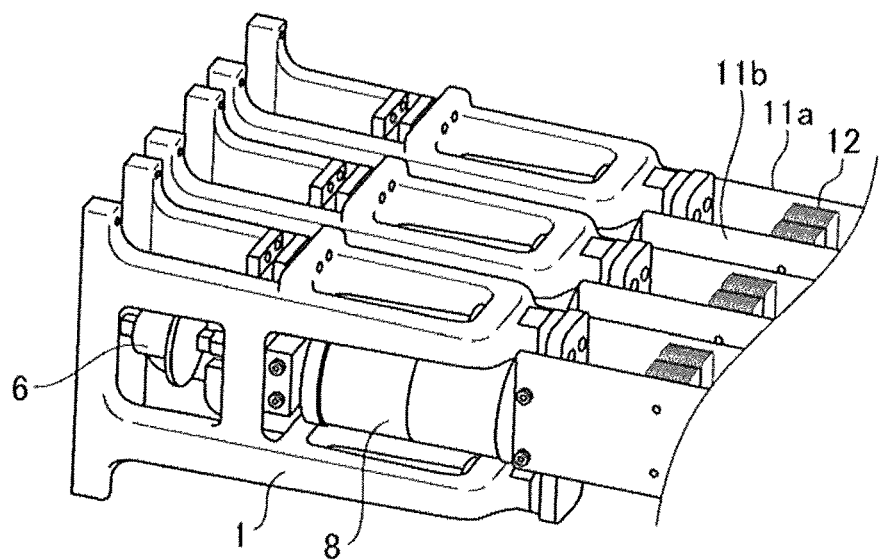
FIG. 10 is a perspective view illustrating the structure of the main part of a vacuum circuit breaker according to embodiment 2 of the invention.

Embodiment 2 is characterized in that, as illustrated in FIG. 10, a radiating fin 12 is disposed between the fixed side conductor 11a and the fixed side conductor 11b of the main circuit structure body of the vacuum circuit breaker. Since the structure excluding the radiating fin 12 is the same as in embodiment 1, repeated description is omitted.

When the radiating fin 12 is provided between the fixed side conductor 11a and the fixed side conductor 11b as described above, heat generated in the fixed side conductor 11a and 11b is easily radiated to the atmosphere by the convection of air. In addition, since the radiating fin 12 is disposed in the space sandwiched by the fixed side conductor 11a and the fixed side conductor 11b, the electric field around the radiating fin 12 is hardly increased and the withstand voltage performance is not reduced.

Embodiment 3

Next, the vacuum circuit breaker according to embodiment 3 of the invention will be described with reference to FIG. 11.

Figure 11:
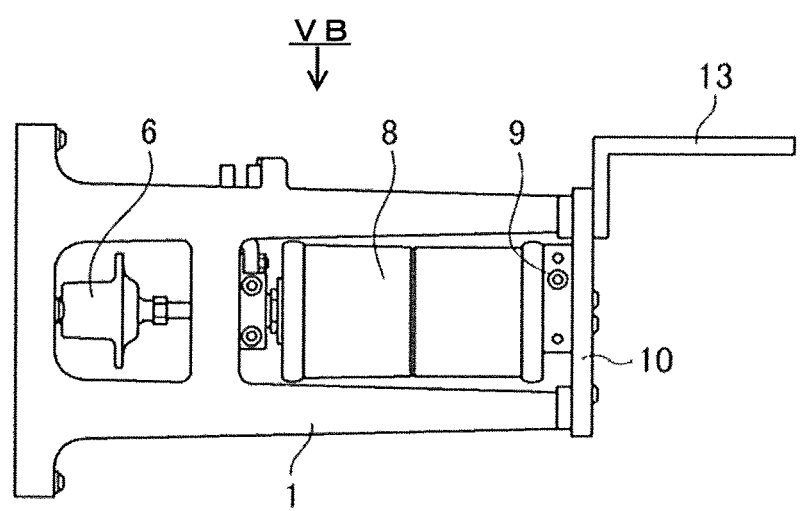
FIG. 11 is a side view illustrating the structure of the main part of a vacuum circuit breaker according to embodiment 3 of the invention.

Although the fixed side terminal 9 is made of a highly conductive metal and the fixation plate 10 is made of an inexpensive metal such as iron to achieve the functions of energization and reinforcement in embodiment 1 above, both the fixed side terminal 9 and the fixation plate 10 may be made of a metal having high energization performance, such as copper or aluminum and the fixed side conductor 13 may be directly tightened to the fixation plate 10, as illustrated in FIG. 11.

In such a structure, although the cost of the main circuit structure body becomes higher because the amount of metal such copper or aluminum, which is more expensive than iron, increases, the fixed side conductor 13 can be directly tightened to the fixation plate 10, thereby improving the efficiency of assembly work.

Although the fixation plate fixation portions 4 at the corners of the insulating holder 1 are horizontally disposed in the upper and lower portions of the corners of the insulating holder 1 in embodiment 1 to embodiment 3 above, the invention is not limited to the embodiments. For example, even if the up and down direction of the insulating holder 1 illustrated in FIG. 2 is rotated 90 degrees so as to coincide with the horizontal direction and the fixation plate fixation portions 4 at the corners of the insulating holder 1 are disposed in the up and down direction on the left and right sides of the corners of the insulating holder 1 (that is, the main circuit structure body of the vacuum circuit breaker is configured so that FIG. 3 is changed to a plan view and FIG. 4 is changed to a side view), the same effects can be obtained.

In addition, part or all of embodiments of the invention may be combined freely or embodiments of the invention may be modified or omitted as appropriate within the scope of the invention.

REFERENCE SIGNS LIST

1: insulating holder
2: movable conductor fixation portion of vacuum circuit breaker
3: insulating holder fixation portion
4: fixation plate fixation portion of breaker
5a: insulation rod side surface opening portion of vacuum circuit breaker main circuit
5b: insulation rod top surface opening portion of vacuum circuit breaker main circuit
5c: vacuum valve side surface opening portion
5d: vacuum valve top surface opening portion
6: insulation rod
7a: vacuum valve movable side terminal
7b: movable conductor
8: vacuum valve
9: vacuum valve fixed side terminal
10: fixation plate
11, 11a, 11b, 13: fixed side conductor
12: radiating fin
101: U-shaped frame of insulating holder
103: intermediate frame of insulating holder

The invention claimed is:

1. A vacuum circuit breaker comprising:
a main circuit structure body including a vacuum valve having a fixed contact and a movable contact, a fixed side terminal connected to the fixed contact of the vacuum valve, a movable side terminal connected to the movable contact of the vacuum valve, and an insulation rod coupled to the movable contact of the vacuum valve, the insulation rod opening and closing the fixed contact and the movable contact; and
an insulating holder for supporting the main circuit structure body,
wherein the insulating holder is a frame structure body having opening portions in top and bottom surfaces and both side surfaces of a section in which the vacuum valve is disposed and a section in which the insulation rod is disposed,
the frame structure body includes two U-shaped frames stacked, insulating holder fixation portions connecting one ends of the U-shaped frames close to opening portions of the U-shaped frames, and intermediate frames coupling intermediate portions of the U-shaped frames,
the insulation rod is disposed in a space surrounded by the insulating holder fixation portions, the intermediate frames, and parts of the U-shaped frames close to the insulating holder fixation portions, and
the vacuum valve is disposed in a space surrounded by corners of the U-shaped frames and the intermediate frames.

2. The vacuum circuit breaker according to claim 1,
wherein the insulating holder has three sections in which the vacuum valves are disposed and three sections in which the insulation rods are disposed and the insulating holder is formed by integrating the six sections.

3. The vacuum circuit breaker according to claim 2,
wherein a fixation plate made of an inexpensive metal having low energization performance is attached to fixation portions provided at corners of the insulating holder, a fixed side terminal made of a metal having high energization performance is attached to the vacuum valve, the fixed side terminal is tightened to the fixation plate so as to support the main circuit structure body, and a fixed side conductor is directly connected to the fixed side terminal of the main circuit structure body.

4. The vacuum circuit breaker according to claim 2,
wherein the fixed side conductor connected to the fixed side terminal has a wide shape, is directly connected to both side surfaces of the fixed side terminal, and is disposed so that a wide surface thereof is oriented vertically.

5. The vacuum circuit breaker according to claim 4,
wherein a radiating fin is provided between the at least two fixed side conductors tightened to both side surfaces of the fixed side terminal.

6. The vacuum circuit breaker according to claim 1,
wherein a fixation plate made of an inexpensive metal having low energization performance is attached to fixation portions provided at corners of the insulating holder, a fixed side terminal made of a metal having high energization performance is attached to the vacuum valve, the fixed side terminal is tightened to the fixation plate so as to support the main circuit structure body, and a fixed side conductor is directly connected to the fixed side terminal of the main circuit structure body.

7. The vacuum circuit breaker according to claim 6,
wherein the fixed side conductor connected to the fixed side terminal has a wide shape, is directly connected to both side surfaces of the fixed side terminal, and is disposed so that a wide surface thereof is oriented vertically.

8. The vacuum circuit breaker according to claim 7,
wherein a radiating fin is provided between the at least two fixed side conductors tightened to both side surfaces of the fixed side terminal.

9. The vacuum circuit breaker according to claim 1,
wherein the fixed side conductor connected to the fixed side terminal has a wide shape, is directly connected to both side surfaces of the fixed side terminal, and is disposed so that a wide surface thereof is oriented vertically.

10. The vacuum circuit breaker according to claim 9, wherein a radiating fin is provided between the at least two fixed side conductors tightened to both side surfaces of the fixed side terminal.

11. The vacuum circuit breaker according to claim 3, wherein the fixed side conductor connected to the fixed side terminal has a wide shape, is directly connected to both side surfaces of the fixed side terminal, and is disposed so that a wide surface thereof is oriented vertically.

12. The vacuum circuit breaker according to claim 11, wherein a radiating fin is provided between the at least two fixed side conductors tightened to both side surfaces of the fixed side terminal.

* * * * *